United States Patent
Cardona et al.

(10) Patent No.: US 8,891,359 B2
(45) Date of Patent: Nov. 18, 2014

(54) SELECTIVE LINK AGGREGATION IN A VIRTUALIZED ENVIRONMENT

(75) Inventors: Omar Cardona, Austin, TX (US); James B. Cunningham, Austin, TX (US); Baltazar De Leon, III, Austin, TX (US); Jorge Rafael Nogueras, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 13/454,232

(22) Filed: Apr. 24, 2012

(65) Prior Publication Data

US 2012/0210039 A1    Aug. 16, 2012

Related U.S. Application Data

(63) Continuation of application No. 12/608,620, filed on Oct. 29, 2009.

(51) Int. Cl.
| | | |
|---|---|---|
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04L 12/28* | (2006.01) | |
| *H04L 12/709* | (2013.01) | |
| *H04L 12/771* | (2013.01) | |
| *H04L 12/931* | (2013.01) | |

(52) U.S. Cl.
CPC .............. *H04L 45/245* (2013.01); *H04L 45/56* (2013.01); *H04L 49/00* (2013.01); *H04L 49/356* (2013.01); *H04L 49/70* (2013.01); *Y02B 60/33* (2013.01)

USPC ........................................................ 370/225

(58) Field of Classification Search
None
See application file for complete search history.

(56) References Cited

U.S. PATENT DOCUMENTS

| | | | |
|---|---|---|---|
| 6,163,543 A | * | 12/2000 | Chin et al. .................... 370/400 |
| 6,631,141 B1 | | 10/2003 | Kumar et al. |
| 7,023,797 B2 | | 4/2006 | Tagore-Brage |
| 7,145,866 B1 | | 12/2006 | Ting et al. |
| 7,529,180 B1 | | 5/2009 | Karl et al. |

(Continued)

FOREIGN PATENT DOCUMENTS

| | | |
|---|---|---|
| EP | 1624638 A1 | 2/2006 |
| WO | 2008064105 A2 | 5/2008 |

OTHER PUBLICATIONS

Author Unknown, IEEE 802.1Q Standard, pp. 1-312, 2003.*
U.S. Appl. No. 12/908,545, Non Final Office Action, May 2, 2013.

(Continued)

*Primary Examiner* — Christopher Crutchfield
(74) *Attorney, Agent, or Firm* — Garg Law Firm, PLLC; Rakesh Garg; Damion Josephs

(57) ABSTRACT

A method for selective link aggregation in a virtualized data processing environment is provided in the illustrative embodiments. A data packet is received at a switch. An identifier associated with the data packet is determined. The identifier corresponds to a logical partition in a logical partitioned data processing system. A lookup is performed in a data structure to determine a set of ports associated with the identifier. The set of ports is retrieved from the data structure. A port is selected from the set of ports and the data packet is transmitted from the port to the logical partition.

21 Claims, 7 Drawing Sheets

(56) References Cited

U.S. PATENT DOCUMENTS

| | | | |
|---|---|---|---|
| 7,684,410 B2* | 3/2010 | Wackerly | 370/395.53 |
| 2003/0147387 A1* | 8/2003 | Devi et al. | 370/390 |
| 2003/0208551 A1 | 11/2003 | Matters et al. | |
| 2004/0098501 A1 | 5/2004 | Finn | |
| 2007/0002826 A1 | 1/2007 | Bennett et al. | |
| 2007/0058602 A1* | 3/2007 | Shimada | 370/340 |
| 2007/0260910 A1 | 11/2007 | Jain et al. | |
| 2008/0080544 A1 | 4/2008 | Mani et al. | |
| 2008/0215910 A1 | 9/2008 | Gabriel et al. | |
| 2008/0310421 A1 | 12/2008 | Teisberg et al. | |
| 2009/0109998 A1 | 4/2009 | Vinayagam et al. | |
| 2010/0115174 A1 | 5/2010 | Akyol et al. | |
| 2010/0124271 A1 | 5/2010 | Martz et al. | |
| 2011/0032944 A1 | 2/2011 | Elzur et al. | |
| 2011/0103396 A1 | 5/2011 | Cardona et al. | |
| 2012/0016970 A1 | 1/2012 | Shah et al. | |
| 2012/0102217 A1 | 4/2012 | Cardona et al. | |

OTHER PUBLICATIONS

U.S. Appl. No. 12/908,545, Amendment after non final office action, Feb. 19, 2013.

U.S. Appl. No. 12/908,545, Non Final Office Action, Nov. 20, 2012.

U.S. Appl. No. 12/908,545, Preliminary amendment, Apr. 16, 2012.

USPTO, Non Final Office Action Nov. 20, 2012, U.S. Appl. No. 12/908,545.

Watanabe, Takafumi et al., "Impact of Topology and Link Aggregation on PC Cluster with Ethernet", IEEE International Conference on Cluster Computer, 2008, PD. 280-285.

U.S. Appl. No. 13/447,605.

Office Action mailed May 2, 2013 for U.S. Appl. No. 12/908,545, 11 Pages.

Response to Office Action filed with the USPTO on Jul. 31, 2013 for U.S. Appl. No. 12/908,545, 19 pages.

Notice of Allowance mailed Apr. 17, 2014 for U.S. Appl. No. 12/908,545, 16 Pages.

Merchant, Shehzad, "VEPA: An Answer to Virtual Switching", Network World, Dec. 23, 2010, 3 Pages.

Final Rejection mailed Apr. 15, 2014 for U.S. Appl. No. 13/447,605, 11 Pages.

USPTO, Notice of Allowance—Jun. 4, 2014, pp. 1-9, U.S. Appl. No. 13/447,605.

* cited by examiner

*FIG. 2*
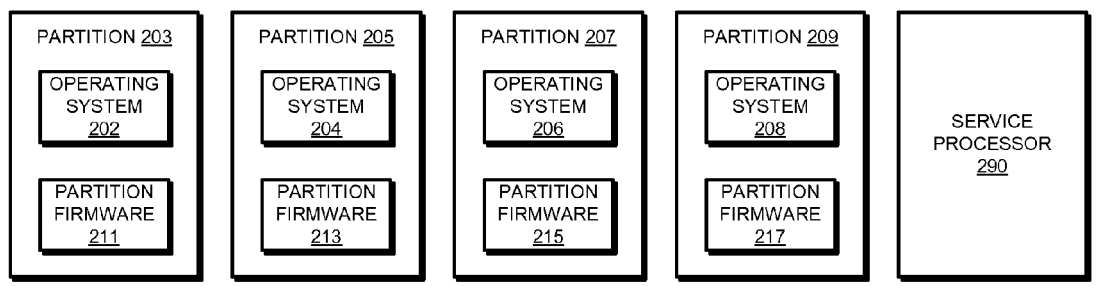
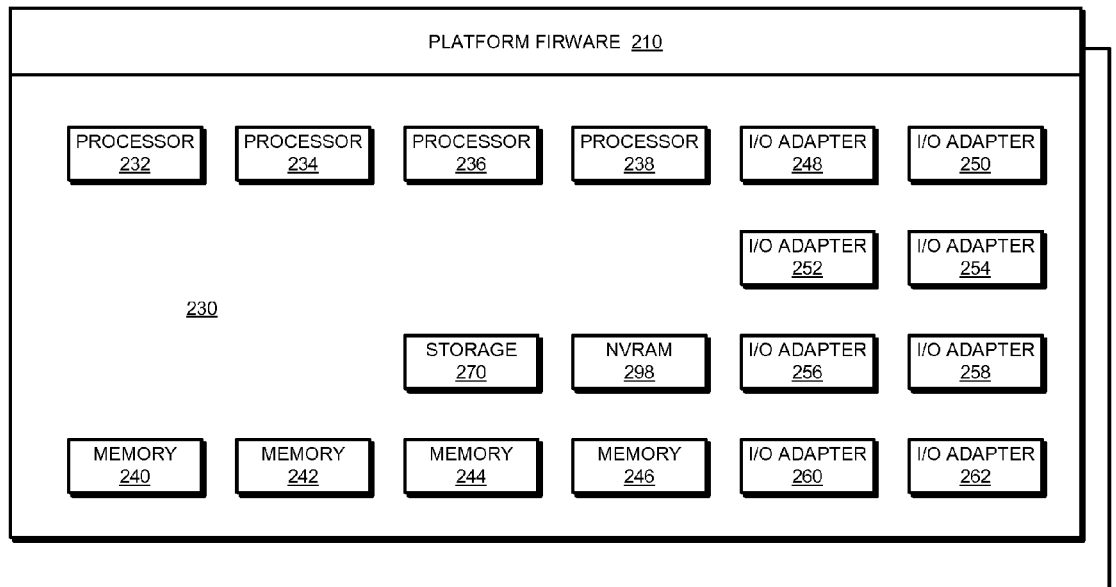
LOGICAL PARTITIONED
PLATFORM
200

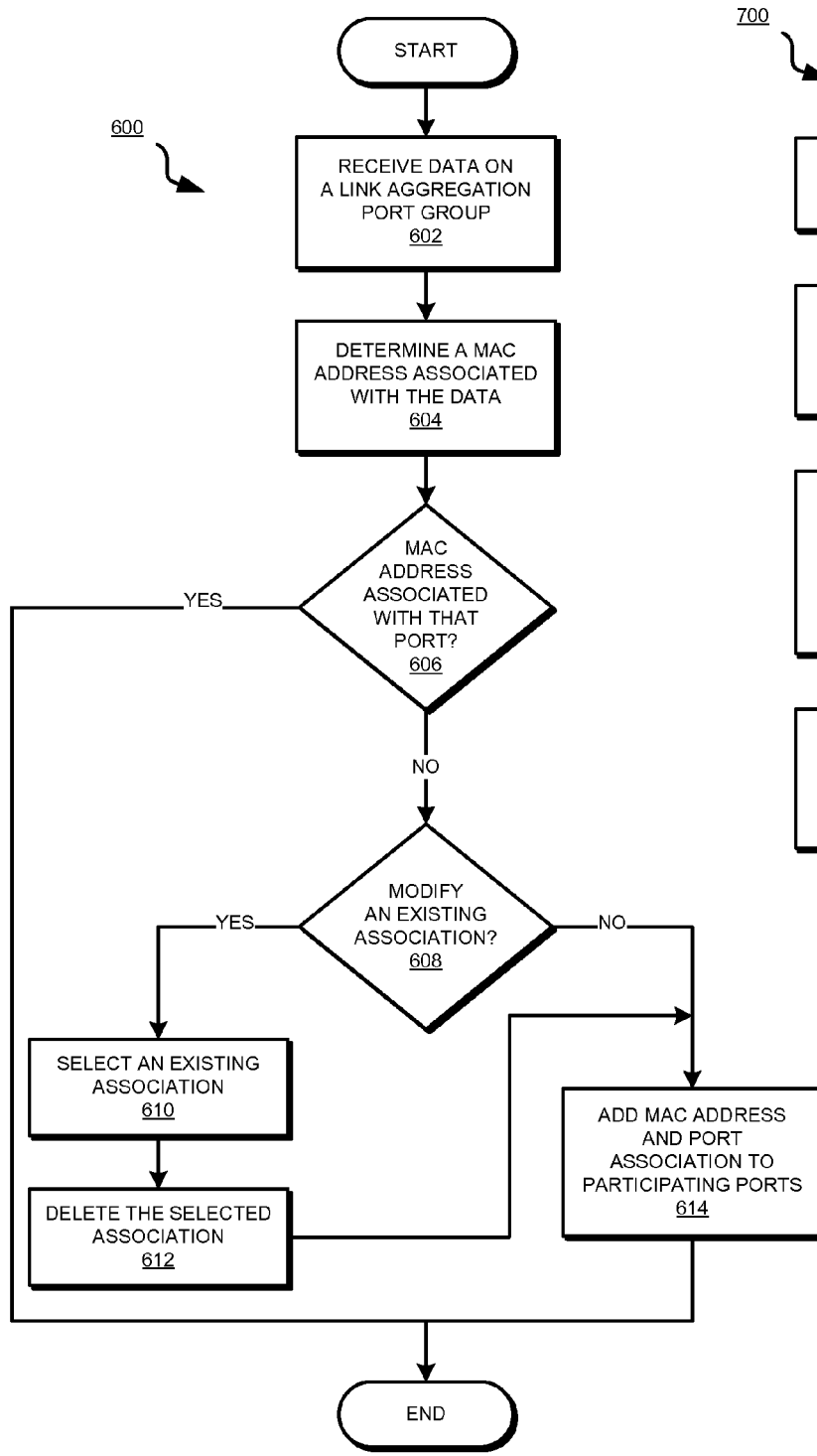

SELECTIVE LINK AGGREGATION IN A VIRTUALIZED ENVIRONMENT

BACKGROUND OF THE INVENTION

1. Field of the Invention

The present invention relates generally to an improved data processing system, and in particular, to a computer implemented method for data communications in a data processing environment. Still more particularly, the present invention relates to a computer implemented method for selective link aggregation in a virtualized data processing environment.

2. Description of the Related Art

Data processing systems can be divided into logical partitions (LPARs). A logical partition is also known as a logical partitioned data processing system, or simply as a "partition". Each partition operates as a separate data processing system independent of the other partitions. Generally, a partition management firmware connects the various partitions and provides the network connectivity among them. Hypervisor is an example of such partition management firmware.

A partition or another commonly used data processing system may access one or more data storage devices for reading, writing, storing, and managing data. A partition may also access one or more data communication network (network) for sending and receiving data, such as from a data storage device. A network may be a local area network (LAN) or a wide area network (WAN).

In some partitioned data processing systems, virtual input/output (I/O) servers provide the partitions access to one or more network or data storage device. A data storage device may include one or more physical data storage units, such as hard disks, as in the case of a storage array, or a storage area network (SAN).

A partition, with or without the use of a virtual I/O server, may access a network over more than one data communication paths. A communication path is also called a link. A link typically facilitates data communication between an I/O adapter and a data port, such as a port on a switch. A switch is any device that facilitates data communication between two or more data processing systems or components thereof. A common variety of switches enables multiple data processing systems and networking capable data processing system components to communicate with each other, with a data network, or both.

A partition utilizing multiple links to communicate with a network may use multiple I/O adapters or multiple ports on an I/O adapter to communicate with multiple corresponding ports on a switch. Each I/O adapter port communicates with a port on the switch. An I/O adapter port is a point of ingress and egress of data to and from the I/O adapter. Similarly, a port on a switch is a point of ingress and egress of data to and from the switch.

Multiple links can be logically grouped together so that they appear to a partition and a switch as a communication channel of multiple links between the partition and the switch. The communication channel hides the individual I/O adapters or I/O adapter ports from the applications using those adapters for data communication such that data communication from such an application can be serviced by any of the I/O adapter ports participating in the communication channel. A group of multiple links operating as a communication channel in this manner is called a link aggregation channel.

Link aggregation channel configurations are commonly employed in data processing environments for increasing the data throughput rates between a data processing system and a switch. Link aggregation channels also improve the reliability of the data communications between a data processing system and a switch by providing redundant data communication paths between them.

SUMMARY OF THE INVENTION

The illustrative embodiments provide a method for selective link aggregation in a virtualized data processing environment. According to the invention, an embodiment receives a data packet at a switch. The embodiment determines an identifier associated with the data packet. The identifier corresponds to a logical partition in a logical partitioned data processing system. The embodiment performs a lookup in a data structure to determine a set of ports associated with the identifier. The embodiment retrieves the set of ports from the data structure. The embodiment selects a first port from the set of ports and transmits the first data packet from the first port to the logical partition.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 2 depicts a block diagram of an example logical partitioned platform in which the illustrative embodiments may be implemented;

FIG. 6 depicts a flowchart of a process of managing a participating ports table in accordance with an illustrative embodiment;

FIG. 7 depicts a flowchart of a process of sending data to data processing system according to selective link aggregation in accordance with an illustrative embodiment.

DETAILED DESCRIPTION OF THE PREFERRED EMBODIMENT

Figure 1:
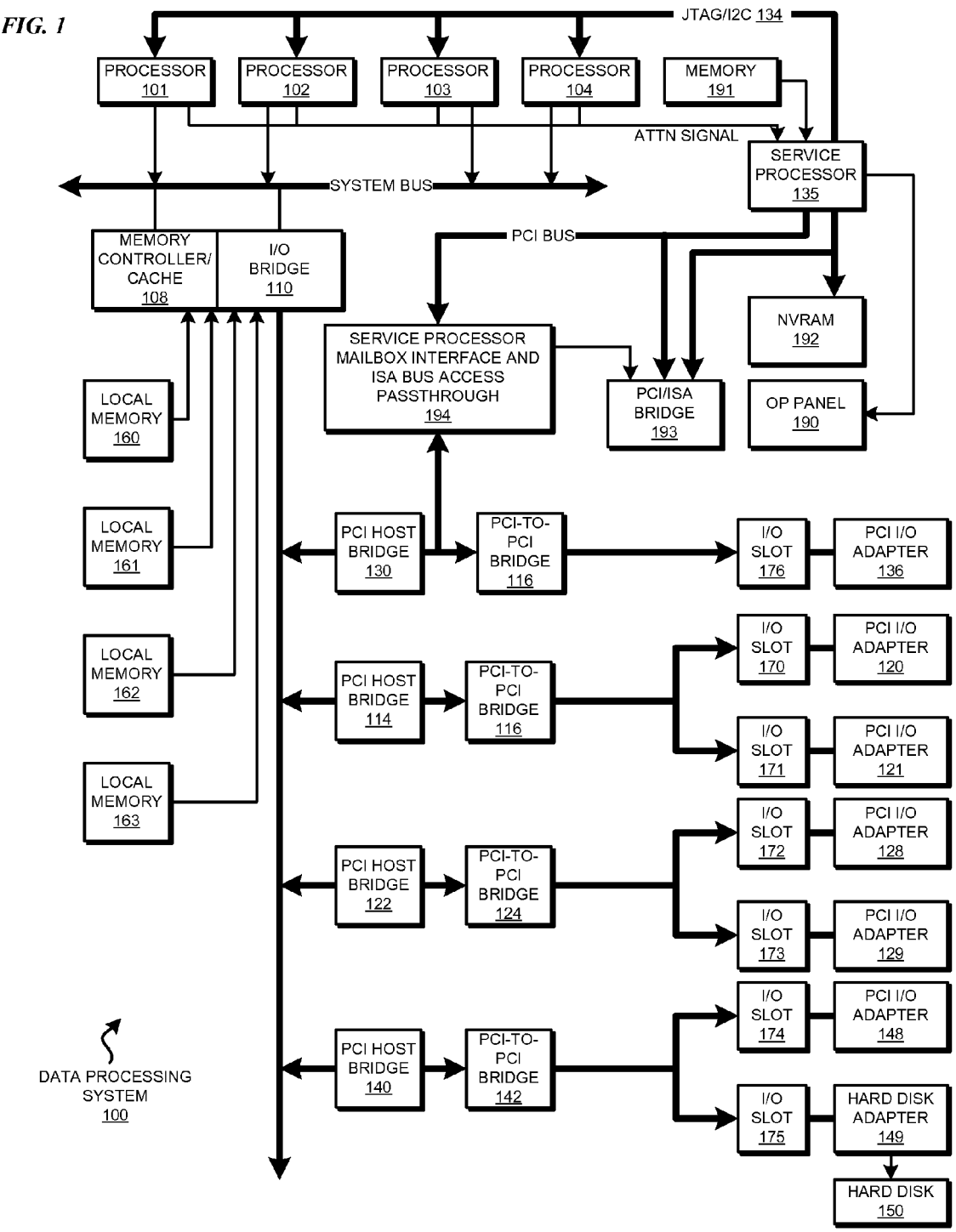
FIG. 1 depicts a block diagram of a data processing system in which the illustrative embodiments may be implemented is depicted.

Presently, a switch administrator determines which ports to associate with a link aggregation channel, and a host administrator determines which I/O adapter ports in the data processing system to associate with the link aggregation channel. Each I/O adapter port has a corresponding port on the switch.

The I/O adapter ports and the corresponding ports on the switch are then cabled accordingly and designated as a link aggregation channel. At the switch, the group of ports that participate in a link aggregation channel is called a link aggregation port group, or simply a port group.

An application in the data processing system can send and receive data over the link aggregation channel. In such a case the number, identify, configuration, and other details related to the individual I/O adapters participating in the link aggregation channel are hidden from the application. By using the link aggregation channel, the application gets the benefit of higher throughput and better reliability of data communication as compared to when using a single link.

The invention recognizes that under some circumstances, a data processing system may not configure the I/O adapters to participate in a link aggregation channel. For example, in a partitioned data processing environment, two partitions may share a common set of physical I/O adapters (PIOAs) using a set of virtual I/O adapters (VIOAs). A set of PIOAs is one or more PIOA. A set of VIOAs is one or more VIOA.

One partition may configure the VIOAs in the partition such that the set of PIOAs participate in a link aggregation channel. An application on the other partition may prefer that the other partition not designate the set of PIOAs to participate in a link aggregation channel.

The invention recognizes that presently available tools and technology for creating and operating link aggregation channels does not permit partitions to operate in this manner. For reasons recognized by the invention and described in this disclosure, present technology mandates that if one partition designates a set of PIOAs to participate in a link aggregation channel, all other partitions wanting to use a PIOA in the set of PIOAs must also designate the set of PIOAs for participating in the link aggregation channel.

The invention further recognizes that if a partition fails to configure and use the link aggregation channel when another partition has configured to use the link aggregation channel, the partition not using the link aggregation channel experiences data loss. For example, in a packet data communication method, the partition that is not configured to use the link aggregation channel may experience packet loss.

The illustrative embodiments used to describe the invention address and solve the problem related to the mandatory configuration of a link aggregation channel in all partitions if one partition configures to use to link aggregation channel. The illustrative embodiments provide a method for selective link aggregation in data processing environments generally, and particularly in virtualized data processing environments.

Using the illustrative embodiments, various partitions in a virtualized environment can be freely configured for using or not using a link aggregation channel. Using the invention, a partition need not configure a PIOA to participate in a link aggregation channel even if another partition chooses to configure the PIOA for participating in the link aggregation channel. Using the invention, partitions can avoid experiencing data loss due to the different configurations of PIOAs by different partitions.

The examples in this disclosure are used only for the clarity of the description and are not limiting on the illustrative embodiments. Additional operations, actions, tasks, activities, and manipulations will be conceivable from this disclosure and the same are contemplated within the scope of the illustrative embodiments.

The illustrative embodiments are described using specific code, data structures, designs, layouts, schematics, and tools only as examples and are not limiting on the illustrative embodiments. The illustrative embodiments may be implemented with respect to any type of data storage device or network.

Furthermore, the illustrative embodiments are described in some instances using particular software tools and data processing environments only as an example for the clarity of the description. The illustrative embodiments may be used in conjunction with other comparable or similarly purposed systems, applications, or architectures.

For example, some illustrative embodiments that are described in conjunction with virtualized logical partitioned environments can be used in conjunction with any data processing system where the illustrative embodiments can be implemented in the manner described within the scope of the invention. For example, an operation described with respect to a virtual device in this disclosure can be similarly implemented with respect to a real or physical device in certain data processing systems without departing the scope of the invention.

As another example, some illustrative embodiments that are described as using a switch may use other networking devices in a similar manner within the scope of the invention. For example, an implementation of an embodiment of the invention may use a router, gateway, modem, or a hub in place of or in conjunction with a switch.

Even though a PIOA can include multiple ports, the illustrative embodiments of the invention are described using one port per PIOA for convenience and clarity of the description. One-port-per-PIOA is not intended to assert a limitation on the invention. The invention is equally and similarly applicable to PIOAs with multiple ports.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM eServer® implemented as a server within a network. (eServer is a product and e(logo) server is a trademark of International Business Machines Corporation in the United States and other countries). Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within partition P1, a second instance (image) of the AIX operating system may be executing within partition P2, and a Linux® or OS/400® operating system may be operating within logical partition P3. (AIX and OS/400 are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logical partitioned platform in which the illustrative embodiments may be implemented. The hardware in logical partitioned platform 200 may be implemented as, for example, data processing system 100 in FIG. 1.

Logical partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the In a virtualized data processing environment, such as a partition, physical PIOAs are often accessed and utilized through VIOAs. As an example, PCI I/O adapters 136, 120, 121, 128, 129, and 148, and hard disk adapter 149 in FIG. 1, or I/O adapters 248, 250, 252, 254, 256, 258, 260, and 262 in FIG. 2 are each an example of a PIOA.

A VIOA is a logical construct that behaves like a PIOA such that an application or a component of a data processing system can use the VIOA in a manner similar to a PIOA. Furthermore, a VIOA may correspond to one or more PIOAs in a given configuration.

A virtual I/O server is a component of a data processing system that manages VIOAs and provides applications and other components of the data processing system access to the VIOAs. A Virtual I/O server may be implemented as hardware component, software component, or a combination thereof.

Figure 3:
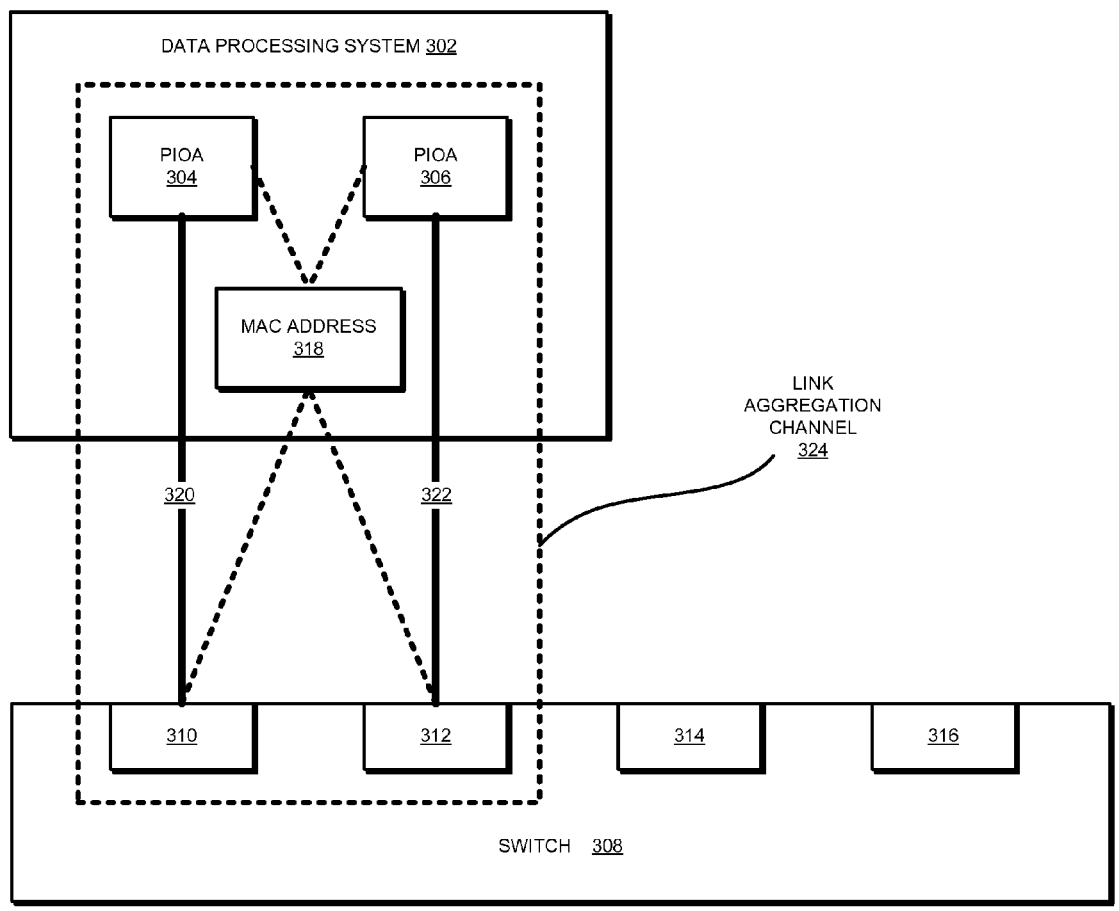
FIG. 3 depicts a block diagram of a link aggregation channel configuration in which an illustrative embodiment can be implemented.

With reference to FIG. 3, this figure depicts a block diagram of a link aggregation channel configuration in which an illustrative embodiment can be implemented. Data processing system 302 can be implemented using data processing system 100 in FIG. 1, or any other data processing system configured with multiple I/O adapters, such as multiple Ethernet adapters.

When a data processing system configures a set of PIOAs for participating in a link aggregation channel, the data processing system assigns a common source media access control address (MAC address) to the PIOAs. A MAC address is an identifier associated with a data processing system component, such as a PIOA, that uniquely identifies the component, the data processing system, or both, in a given network. A source MAC address is a MAC address associated with a data source.

In configuring a PIOA to participate in a link aggregation channel, the common source MAC address identifies all PIOAs identically to the switch. In other words, from the switch's point of view, each PIOA in the set of PIOAs appears to be associated with the same MAC address; therefore, the switch considers all PIOAs in the set to be one PIOA.

When the PIOAs participating in the link aggregation channel are configured with a common source MAC address, a data packet transmitted from any of the so configured PIOAs is associated with the common source MAC address. Thus, from the point of view of a receiver of such data, such as a port on a switch, the data appears to have come from one PIOA at the data processing system regardless of which actual PIOA in the set of PIOAs transmitted the data.

Furthermore, data directed to the data processing system can be associated with the common source MAC address. Any of the PIOAs configured to participate in the link aggregation channel can receive that data, such as from a link aggregation enabled switch. For example, a switch may have a port group, each port of which is linked to a PIOA in the set of PIOAs participating in the link aggregation channel. The switch can compute that the destination MAC address associated with data bound for the data processing system is the common source MAC address associated with the data processing system's PIOAs participating in the link aggregation channel. The switch can use the common source MAC address to direct the data to any of the ports in the port group.

In FIG. 3, as an example, data processing system 302 is depicted as including PIOAs 304 and 306. Switch 308 may be a link aggregation enabled switch. Switch 308 may include any number of ports, for example, ports 310, 312, 314, and 316.

Switch 308 may be any suitable networking device, such as a router, a gateway, a switch, or a modem. Furthermore, switch 308 may be any networking device that may support one or more wired or wireless data communication protocols.

In one embodiment, switch 308 may be a gateway, which is a device at a network node for interfacing with another network that uses different protocols. In another embodiment, switch 308 may be a router, which is a specialized network device that determines the next network point to which to forward a data packet toward its destination. In another embodiment, switch 308 may be a bridge, which is a device that connects multiple network segments along the data link layer. In another embodiment, switch 308 may be a commonly known switch, which is a device that allocates traffic from one network segment to certain lines (intended destination(s)) which connect the segment to another network segment. In another embodiment, switch 308 may be a hub, which connects multiple Ethernet segments together making them act as a single segment. In another embodiment, switch 308 may be a repeater, which is a device to amplify or regenerate digital signals received while sending them from one part of a network into another.

In another embodiment, switch 308 may be a hybrid network device. For example, in one embodiment, switch 308 may be a multilayer Switch, which is a switch which, in addition to switching on OSI layer 2, provides functionality at higher protocol layers. In another embodiment, switch 308 may be a protocol Converter, which is a hardware device that converts between two different types of transmissions, such as asynchronous and synchronous transmissions. In another embodiment, switch 308 may be a bridge router (Brouter), which combines router and bridge functionality and works on OSI layers 2 and 3. In another embodiment, switch 308 may be a digital media receiver, which connects a computer network to a device, such as a home theatre system, in a local environment.

In another embodiment, switch 308 may be a combination of hardware or software components that typically operate on the connection point of different networks, such as between an internal network and an external network. For example, in one embodiment, switch 308 may be a proxy, which is a computer network service that allows clients to make indirect network connections to other network services. In another embodiment, switch 308 may be a firewall, which is generally a piece of hardware or software put on the network to prevent some communications forbidden by the network policy. In another embodiment, switch 308 may be a Network Address Translator, which is a network service implemented as hardware or software that converts internal network addresses to external network addresses and vice versa.

Switch 308 may also be other hardware, software, or a combination thereof, for establishing networks or dial-up connections. In one embodiment, switch 308 may be a multiplexer, which is a device that combines several electrical signals into a single signal. In another embodiment, switch 308 may be a network adapter, which is a piece of computer hardware to allow the attached computer to communicate over a data network. In another embodiment, switch 308 may be a modem, which is a device that modulates an analog "carrier" signal (such as sound), to encode digital information, and that also demodulates such a carrier signal to decode the transmitted information, to facilitate a computer in communicating with another computer over a telephony network. In another embodiment, switch 308 may be an ISDN terminal adapter (TA), which is a specialized gateway for ISDN. In another embodiment, switch 308 may be a line driver, which is a device to increase transmission distance by amplifying the signal. The above examples of switch 308 are not intended to be limiting on the illustrative embodiments. For example, an implementation of switch 308 may use another device for a similar purpose, or combine two or more of the above described example devices within the scope of the invention.

Data processing system 302 may assign MAC address 318 to PIOAs 304 and 306. Ports 310 and 312 may be linked to PIOAs 304 and 306 using links 320 and 322 respectively. Links 320 and 322 may each be any type of data communication link, such as a wired or wireless data connection. Furthermore, links 320 and 322 may include any number and type of other data processing systems or components including but not limited to cables, routers, switches, hubs, repeaters, and radio transceivers.

Link aggregation channel 324 may include PIOAs 304 and 306, ports 310 and 312, and links 320 and 322 participating in this example configuration. PIOAs 304 and 306 participate in link aggregation channel 324 by having MAC address 318 as the common source MAC address. Ports 310 and 312 participate in link aggregation channel 324 by linking with PIOAs having MAC address 318, to wit, PIOAs 304 and 306.

Figure 4:
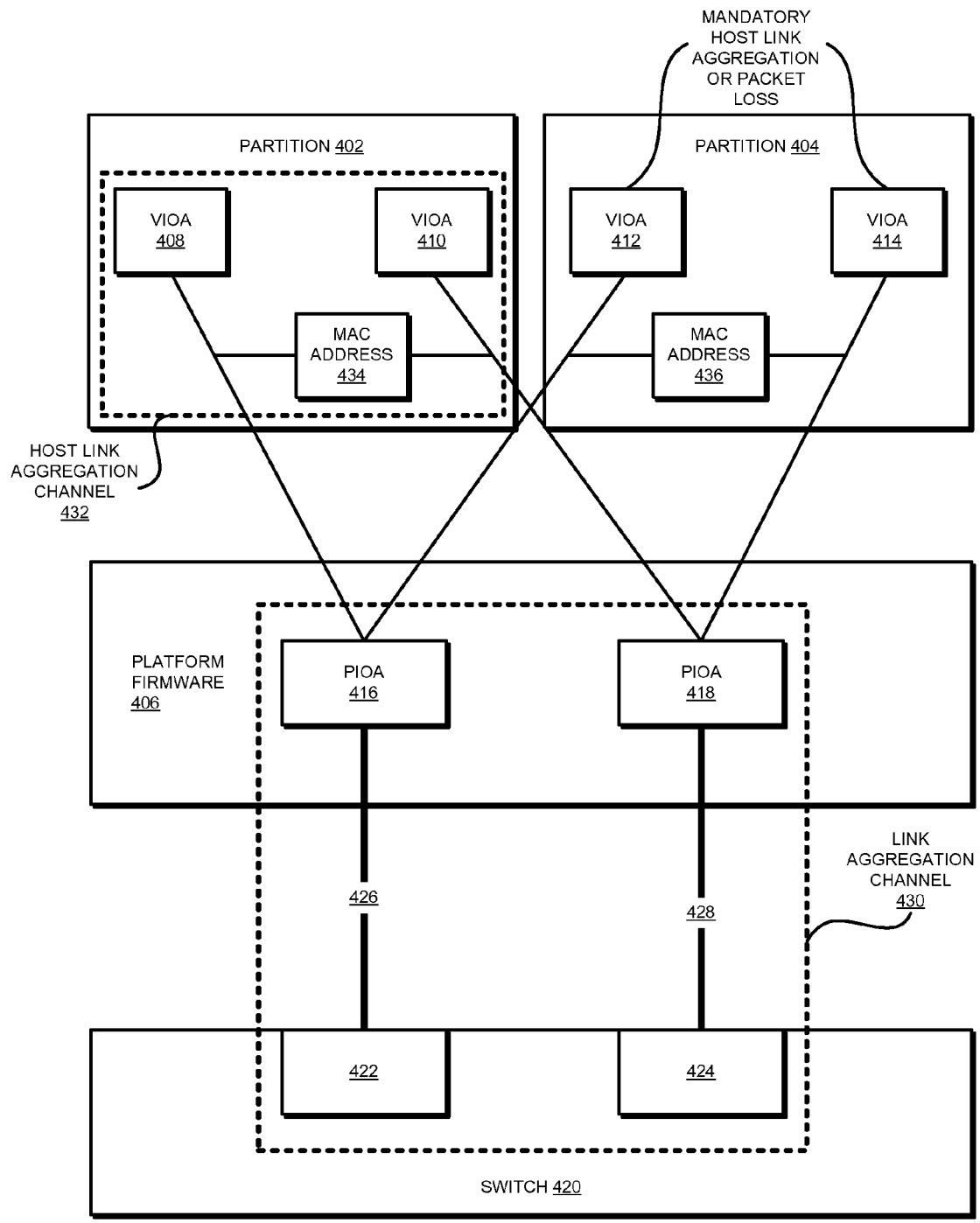
FIG. 4 depicts a block diagram of another link aggregation channel configuration in a virtualized environment in which an illustrative embodiment can be implemented.

With reference to FIG. 4, this figure depicts a block diagram of another link aggregation channel configuration in a virtualized environment in which an illustrative embodiment can be implemented. Partitions 402 and 404 can be implemented using any of partitions 203, 205, 207, or 209 in FIG. 2. Platform firmware 406 may be implemented using platform firmware 210 in FIG. 2.

Partition 402 may include, as an example, VIOAs 408 and 410. Partition 404 may include, as an example, VIOAs 412 and 414. VIOAs 408 and 412 may map or correspond to PIOA 416 in platform firmware 406. Similarly, VIOAs 410 and 414 may map or correspond to PIOA 418 in platform firmware 406.

Switch 420 may be analogous to switch 308 in FIG. 3. Switch 420 includes ports 422 and 424. Port 422 may be linked to PIOA 416 using link 426. Port 424 may be linked to PIOA 418 using link 428. Links 426 and 428 may be analogous to links 320 and 322 in FIG. 3.

Links 426 and 428 may belong to link aggregation channel 430 as a result of partition 402 deciding to configure VIOAs 408 and 410 into host link aggregation channel 432. A host link aggregation channel is the host side configuration of a link aggregation channel.

As a part of configuring host link aggregation channel 432, partition 402 assigns MAC address 434 to VIOAs 408 and 410. By virtue of their mapping to PIOAs 416 and 418, PIOAs 416 and 418 become identified by MAC address 434. Ports 422 and 424 identify PIOAs 416 and 418 with MAC address 434, forming link aggregation channel 430.

Because PIOAs 416 and 418 are in link aggregation channel 430, switch 420 directs any data meant for PIOA 416 to either PIOA 416 or PIOA 418. Similarly, for the same reason, switch 420 directs any data meant for PIOA 418 to with PIOA 416 or PIOA 418. The invention recognizes this behavior of switch 420 as a problem that may cause data loss for partition 404 as described below.

Assume that VIOAs 412 and 414 in partition 404 are not configured in a host link aggregation channel similar to host link aggregation channel 432. In other words, partition 404 has not configured VIOAs 412 and 414 to be a part of link aggregation channel 430. VIOA 412 maps to PIOA 416 and VIOA 414 maps to PIOA 418. Partition 404 and any applications executing thereon expect to use PIOA 416 when directing data traffic to and from VIOA 412. Similarly, partition 404 and any applications executing thereon expect to use PIOA 418 when directing data traffic to and from VIOA 414.

At switch 420, PIOAs 416 and 418 are known to be in link aggregation channel 430. According to existing state of link aggregation channel technology, the invention recognizes the problem that switch 420 always treat PIOAs 416 and 418 as link aggregation channel 430, whether or not virtual data processing systems such as partitions 402 and 404 configure PIOAs 416 and 418 in a host link aggregation channel.

Consequently, the invention recognizes, in one instance, partition 404 may transmit data on VIOA 412, expecting to receive data on VIOA 412. As expected, transmitted data may transmit via VIOA 412 and corresponding PIOA 416 through port 422 of switch 420.

Switch 420 recognizes from such transmissions of partition 404 that partition 404 communicates on port 422. However, when switch 420 receives data for partition 404, switch 420 may direct the received data to either port 422 or 424 because the switch considers ports 422 and 424 to be in link aggregation channel 430. Thus, when switch 420 selects port 422 from link aggregation channel 430 to send the received data to partition 404, that data is properly received via PIOA 416 at VIOA 412. However, when switch selects port 424 from link aggregation channel 430 to send the received data to partition 404, the invention recognizes that that data is never received at VIOA 412 because port 424 does not communicate with VIOA 412. Thus, partition 404 experiences data loss because the data does not arrive where partition 404 expects to receive the data.

To address this data loss problem associated with present technology, presently, partition 404 must mandatorily configure a host link aggregation channel if partition 402 has configured host link aggregation channel 432. For example, partition 404 must assign MAC address 436 to VIOAs 412 and 414. MAC address 436 then is associated with PIOAs 416 and 418.

Link aggregation enabled switches are presently capable of associating multiple MAC addresses with their ports. Accordingly, switch 420 associates ports 422 and 424 with both MAC address 434 and 436. When switch 420 receives data containing destination MAC address matching MAC address 434, switch 420 sends the data to either port 422 or port 424 of link aggregation channel 430. Partition 402 receives the data because of host link aggregation channel 432 configuration.

Similarly, when switch 420 receives data containing destination MAC address matching MAC address 436, switch 420 sends the data to either port 422 or port 424 of link aggregation channel 430 as well. Partition 404 receives the data because of the mandatorily configured host link aggregation channel using VIOAs 412 and 414.

Figure 5:
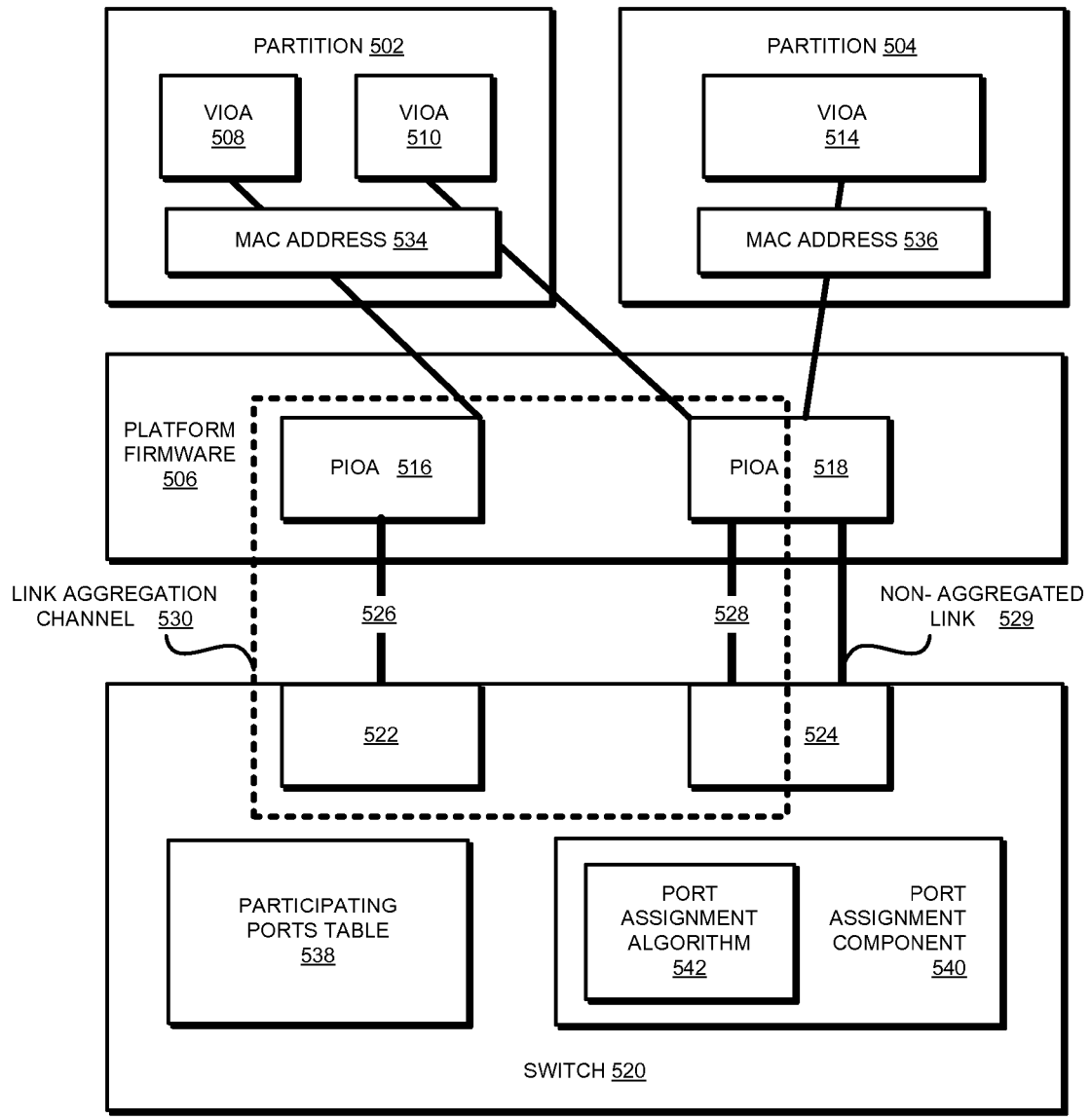
FIG. 5 depicts a block diagram of a link aggregation channel configuration in a virtualized environment in accordance with an illustrative embodiment.

With reference to FIG. 5, this figure depicts a block diagram of a link aggregation channel configuration in a virtualized environment in accordance with an illustrative embodiment. Partitions 502 and 504 can be similar to partitions 402 and 404 respectively in FIG. 4. Platform firmware 506 may be implemented using platform firmware 406 in FIG. 4.

Partition 502 may include, as an example, VIOAs 508 and 510. Partition 504 may include among other VIOAs, as an example, VIOA 514. VIOA 508 may map or correspond to PIOA 516 in platform firmware 506. VIOAs 510 and 514 may map or correspond to PIOA 518 in platform firmware 506.

Switch 520 may be implemented using switch 420 in FIG. 4. Switch 520 includes ports 522 and 524. Port 522 may be linked to PIOA 516 using link 526. Port 524 may be linked to PIOA 518 using a link that represents links 528 and 529. Links 528 and 529 represent two modes of operations of the same link. Link 528 represents the mode of operation when the link between port 524 and PIOA 518 is operating as a part of link aggregation channel 530. Link 529 represents the mode of operation when the link between port 524 and PIOA 518 is operating as a non-aggregated link and not a part of link aggregation channel 530. Link 526 and the link representing links 528 and 529 may be analogous to links 320 and 322 in FIG. 3.

Links 526 and 528 may belong to link aggregation channel 530, such as when partition 502 configures VIOAs 508 and 510 into a host link aggregation channel, by assigning MAC address 534 to VIOAs 508 and 510. Partition 504 may determine that VIOA 514 is not to be used in a host link aggregation channel. Accordingly, partition 504 assigns MAC address 536 to VIOA 514, which maps only to PIOA 518.

According to an illustrative embodiment, partition 502 associates MAC address 534 with a set of data packets. A set of data packets is one or more data packets. Partition 502 transmits the set of data packets such that the data packets egress VIOAs 508 and 510. Switch 520 received some transmitted data packets at ports 522 and some at port 524.

Switch 520 examines the data packets received on ports 522 and 524, and determines that they are received from a source identified by MAC address 534, to wit, partition 502. Switch 520 maintains participating ports table 538. Participating ports table 538 is a data structure accessible to switch 520 where switch 520 can write, read, modify, or otherwise manipulate records of association between ports of switch 520 and source MAC addresses of packets received on those ports.

In the example depicted in FIG. 5, switch 520 associates MAC address 534 with ports 522 and 524. Accordingly, switch 520 writes information in participating ports table 538 that associated MAC address 534 with port 522 and MAC address 534 with port 524.

Similarly, partition 504 associates MAC address 536 with a set of data packets. Partition 504 transmits the set of data packets such that the data packets egress VIOA 514. Switch 520 received the transmitted data packets at ports 524.

Switch 520 examines these data packets received on ports 524, and determines that they are received from a source identified by MAC address 536, to wit, partition 504. Accordingly, switch 520 writes information in participating ports table 538 that associated MAC address 536 with only port 524. Thus, participating ports table 538 provides switch 520 the information that partition 502 communicates on ports 522 and 524 but partition 504 communicates only on port 524.

When switch 520 received data, such as from a network and bound for either partition 502 or partition 504, switch 520 looks up participating ports table 538 for identifying one or more ports associated with the destination MAC address of the received data. Switch 520 selects the set of ports identified in this manner in participating ports table 538. Switch 520 provides the identifiers of selected set of ports, such as port numbers of those ports, to port assignment component 540.

Port assignment component 540 may be a component of switch 520 that determines the port on which the received data should be transmitted to the data processing system coupled to switch 520. Port assignment component 540 may use port assignment algorithm 542 for selecting a port from a set of ports.

Port assignment algorithm 542 may be any algorithm for selecting one item from many items. For example, in one embodiment, port assignment algorithm 542 may be a round-robin algorithm. In another embodiment, port assignment algorithm 542 may be a utilization based load assignment algorithm. In another embodiment, port assignment algorithm 542 may be a randomized load assignment algorithm. These examples of port assignment algorithm 542 are not described only as examples and are not limiting on the invention. Any algorithm suitable for a similar purpose may be used in place of port assignment algorithm 542 within the scope of the invention.

Port assignment component 540 selects a port from the set of ports identified and selected from participating ports table 538. Switch 520 transmits the received data on the port selected by port assignment component 540.

In the example depiction of this figure, participating ports table 538 provides the information that partition 502 communicates on ports 522 and 524 but partition 504 communicates only on port 524. Accordingly, if, for example, a received data packet included as destination MAC address MAC address 534, port assignment component 540 may select either port 522 or port 524 for transmission to partition 502.

If, however, the received data packet included as destination MAC address MAC address 536, port assignment component 540 may select only port 524 for transmission to partition 504. Operating in this manner, the illustrative embodiment avoids the data loss in partition 504, without forcing partition 504 to configure VIOA 514 in a host link aggregation channel.

In this example, partition 502 is shown to use all ports in link aggregation channel 530 form, and partition 504 using only one port in non-aggregated form. These numbers and organization of ports is described here only as an example for clarity and is not intended to be limiting on the invention. In one embodiment, many more partitions could communicate with many more ports on switch 520. Furthermore, in such an embodiment, a partition could assign one MAC address to a group of VIOAs so as to configure a host link aggregation channel, and different MAC addresses to one or more other VIOAs.

Thus, in such an embodiment, a partition could utilize one or more link aggregation channels for some applications and one or more non-aggregated links for some other applications within the scope of the invention. Switch 520 would record the association of ports and MAC addresses in participating ports table 538 in the manner described.

In such an embodiment, when switch 520 receives a data packet, switch 520 would identify MAC address and port number associations in participating ports table 538 in the manner described above. The received data packet would be routed to one of only those ports that are known to have currently communicated with the partition associated with the destination MAC address of the data packet.

Switch 520 may update participating ports table 538 based on new transmissions from the partitions coupled to switch 520. For example, partition 502 may stop using a previously configured host link aggregation channel. Accordingly, partition 502 may provide information to switch 520 such that switch 520 may disassociate MAC address 534 from port 522, associate a new MAC address with port 522, keep port 524 associated with MAC address 534, or perform any other port and MAC address association maintenance.

With reference to FIG. 6, this figure depicts a flowchart of a process of managing a participating ports table in accordance with an illustrative embodiment. Process 600 may be implemented in a link aggregation enabled switch, such as switch 520 in FIG. 5.

Process 600 begins by receiving data on a link aggregation port group (step 602). Process 600 determines a MAC address associated with the data received in step 602 (step 604). In one embodiment, process 600 may determine the MAC address associated with the data by referencing another data source.

Process 600 determines if the MAC address from step 604 is associated with the port on which the data was received in step 602 (step 606). As an example, process 600 may make the determination of step 606 by looking up a participating ports table, such as a participating ports table 538 in FIG. 5.

If the MAC address is associated with that port ("Yes" path of step 606), process 600 ends thereafter. If the MAC address is not associated with that port ("No" path of step 606), process 600 determines whether an existing association of the port has to be modified (step 608).

If an existing association of the port with an existing MAC address is to be modified ("Yes" path of step 608), process 600 selects an existing association of the port with a MAC address (step 610). Process 600 deletes the selected association (step 612).

Process 600 adds an association between the MAC address of step 604 and the port on which the data was received in step 602 (step 614). Process 600 ends thereafter.

If in step 608, process 600 determines that an existing association is not to be modified ('No" path of step 608), process 600 adds an association between the MAC address of step 604 and the port on which the data was received in step 602 according to step 614. Process 600 ends thereafter.

With reference to FIG. 7, this figure depicts a flowchart of a process of sending data to data processing system according to selective link aggregation in accordance with an illustrative embodiment. Process 700 may be implemented in a link aggregation enabled switch, such as switch 520 in FIG. 5.

Process 700 begins by receiving data whose destination is a partition serviced by the switch where process 700 may be executing (step 702). Process 700 determines a MAC address associated with the data received in step 702 (step 704). In one embodiment, process 600 may determine the MAC address associated with the data by referencing another data source.

Process 700 selects from a participating ports table all ports associated with the MAC address determined in step 704 (step 706). Process 700 sends the data received in step 702 to one of the selected ports (step 708). Process 700 ends thereafter. In one embodiment, process 700 may manipulate the data received in step 7-2 before sending in step 708 within the scope of the invention.

Figure 8:
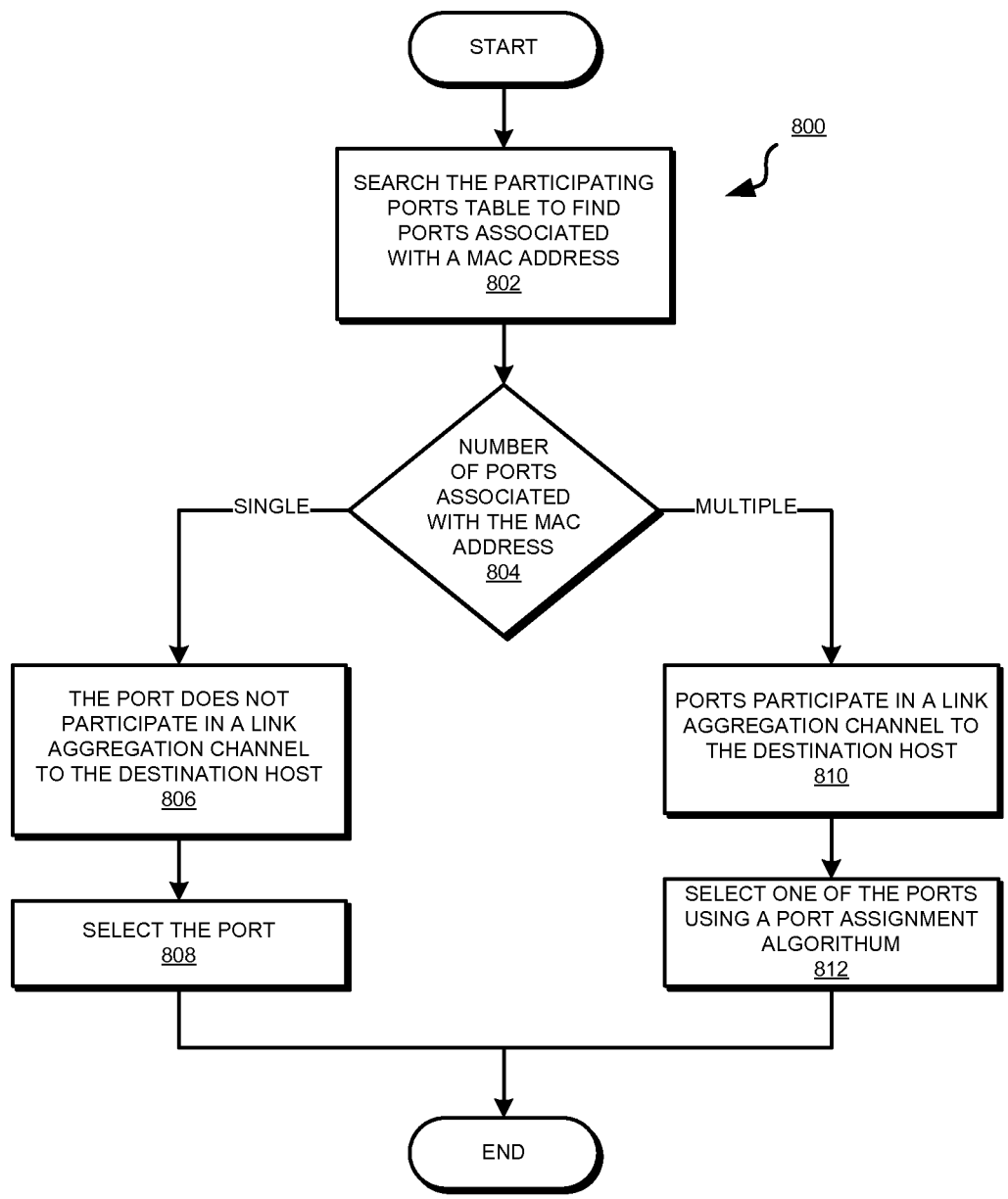
FIG. 8 depicts a flowchart of a process of selecting a link for data transmission in a selective link aggregation environment in accordance with an illustrative embodiment.

With reference to FIG. 8, this figure depicts a flowchart of a process of selecting a link for data transmission in a selective link aggregation environment in accordance with an illustrative embodiment. process 800 may be implemented in a link aggregation enabled switch, such as switch 520 in FIG. 5.

Process 800 begins by searching a participating ports table, such as participating ports table 538 in FIG. 5, to find all the ports associated with a given MAC address (step 802). Process 800 determines a number of ports associated with the MAC address (step 804).

If process 800 determines that no ports are associated with the MAC address (not shown), in one embodiment, process 800 may add a new entry associating the MAC address with a port, such as by executing a portion of process 600 in FIG. 6.

If process determines that a single port is associated with the MAC address ("Single" path of step 804), process 800 concludes that the port does not participate in a link aggregation channel to the destination host (step 806). Process 800 selects the port, thereby selecting a link to the host (step 808). Process 800 ends thereafter.

If process 800 determines that several ports are associated with the MAC address ("Multiple" path of step 804), process 800 concludes that the several ports participate in a link aggregation channel to the destination host (step 810). Process 800 selects one of the several ports, such as by using a port assignment algorithm in step 708 of process 700 in FIG. 7, thereby selecting a link in a link aggregation channel to the host (step 812). Process 800 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method is provided in the illustrative embodiments for selective link aggregation in a virtualized data processing environment. By using one or more illustrative embodiments of the invention, a data processing environment can allow virtualized data processing systems the flexibility of configuring or not configuring a link aggregation channel regardless of link aggregation channel configuration by other data processing systems in the environment. A partition, for example, need not be forced to configure and use a link aggregation channel if another partition in the virtualized environment elects to configure a link aggregation channel with the PIOAs of the platform firmware.

Using the invention, partitions can be free to configure and use the platform firmware's I/O resources in any manner suitable for their needs without suffering data loss or other similar consequences. According to the invention, a partition can use one or more link aggregation channels, each link aggregation channel using any number of PIOAs the partition may designate. Furthermore, the partition can use the link aggregation channels in combination with any number of non-aggregated links. Any combination of partitions can configure and use any combination of link aggregation channels and non-aggregated links using the platform firmware's I/O adapters within the scope of the illustrative embodiments.

Furthermore, even though the illustrative embodiments are described using one switch and the ports thereon, any number of switches may collaborate in implementing the combination of link aggregation channels and non-aggregated links according to the illustrative embodiments. Some present standards related to link aggregation channel technology limit a link aggregation channel to a single switch. However, a physical switch may be abstracted into one or more virtual devices and combined and recombined with other physical switches and their similar abstractions to result in a virtual switch configuration that may overcome this one-switch limitation. Multiple switches collaborating with each other, for example, to share a participating ports table, and implementing the invention is contemplated within the scope of the invention.

The participating ports table according to the invention can take any suitable data structure form according to particular implementation. Furthermore, the participating ports table may be located in any location accessible to a switch in the implementation. For example, in one embodiment, the participating ports table may be a table resident in the switch. In another embodiment, the participating ports table may be a file stored in a data storage device accessible to the switch, such as a compact disc, a flash drive. In another embodiment, the participating ports table may be a file stored in a data storage device accessible to the switch over a network, such as a storage area network device. In another embodiment, the participating ports table may be a database stored in a data processing system accessible to the switch.

Additionally, the invention is described in terms of MAC addresses only for the clarity of the description and is not intended to assert any limitation on the invention. Any identifier capable of identifying a data processing system or a component thereof in a data network may be used in place of MAC addresses in a similar manner without departing the scope of the invention.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for selective link aggregation in a virtualized data processing environment, the computer implemented method comprising:
    receiving at a switch, a first data packet;
    determining a first identifier associated with the first data packet, the first identifier corresponding to a first logical partition in a logical partitioned data processing system, wherein the logical partitioned data processing system includes a second logical partition, wherein the first logical partition and the second logical partition share a physical input/output adapter (PIOA), wherein a first port in the PIOA operates by participating in the link aggregation channel for the first logical partition and the first port in the PIOA operates without participating in any link aggregation channel and as a non-aggregated communication link for the second logical partition;
    performing a lookup in a data structure to determine a set of ports associated with the first identifier;
    retrieving from the data structure the set of ports, the set of ports including the first port;
    selecting the first port from the set of ports; and
    transmitting the first data packet from the first port to the first logical partition.

2. The computer implemented method of claim 1, wherein the data structure is a participating port table accessible to the switch, the data structure comprising:
    a set of records, a record in the set of records associating an identifier with a port.

3. The computer implemented method of claim 1, further comprising:
    manipulating the data structure, the manipulating including one of (i) adding, (ii) deleting, and (iii) modifying, an association between a second port and a second identifier in the data structure.

4. The computer implemented method of claim 3, wherein the adding the association further comprises:
    receiving at the second port a second data packet;
    determining the second identifier associated with the second data packet;
    associating, responsive to the second port not already being associated with the second identifier in the data structure, the second port with the second identifier; and
    adding information describing the association of the second port with the second identifier to the data structure.

5. The computer implemented method of claim 4, responsive to the second port being already associated with a third identifier in the data structure, the computer implemented method further comprising:
    forming a determination whether an information describing the association of the second port and the third identifier should be modified;
    modifying, responsive to the determination being true, the information describing association of the second port and the third identifier to an information describing an association of the second port and the second identifier in the data structure; and
    adding, responsive to the determination being false, an information describing an association of the second port and the second identifier in the data structure.

6. The computer implemented method of claim 1, wherein the selecting the first port further comprises:
    executing a port assignment algorithm, wherein the port assignment algorithm is one of (i) a round-robin selection algorithm, (ii) a utilization based selection algorithm, and (iii) a randomized selection algorithm.

7. The computer implemented method of claim 1, further comprising:
    concluding, responsive to the set of ports including a plurality of ports, that the set of ports participate in a link aggregation channel; and
    concluding, responsive to the set of ports including a single port, that the port is a part of a non-aggregated link.

8. A computer usable program product comprising a computer usable storage device including computer usable code for selective link aggregation in a virtualized data processing environment, the computer usable code comprising:
    computer usable code for receiving at a switch, a first data packet;
    computer usable code for determining a first identifier associated with the first data packet, the first identifier corresponding to a first logical partition in a logical partitioned data processing system, wherein the logical partitioned data processing system includes a second logical partition, wherein the first logical partition and the second logical partition share a physical input/output adapter (PIOA), wherein a first port in the PIOA operates by participating in the link aggregation channel for the first logical partition and the first port in the PIOA operates without participating in any link aggregation channel and as a non-aggregated communication link for the second logical partition;

computer usable code for performing a lookup in a data structure to determine a set of ports associated with the first identifier;

computer usable code for retrieving from the data structure the set of ports, the set of ports including the first port;

computer usable code for selecting the first port from the set of ports; and computer usable code for transmitting the first data packet from the first port to the first logical partition.

9. The computer usable program product of claim 8, wherein the data structure is a participating port table accessible to the switch, the data structure comprising:

a set of records, a record in the set of records associating an identifier with a port.

10. The computer usable program product of claim 8, further comprising:

computer usable code for manipulating the data structure, the computer usable code for manipulating including computer usable code for one of (i) adding, (ii) deleting, and (iii) modifying, an association between a second port and a second identifier in the data structure.

11. The computer usable program product of claim 10, wherein the computer usable code for adding the association further comprises:

computer usable code for receiving at the second port a second data packet;

computer usable code for determining the second identifier associated with the second data packet;

computer usable code for associating, responsive to the second port not already being associated with the second identifier in the data structure, the second port with the second identifier; and computer usable code for adding information describing the association of the second port with the second identifier to the data structure.

12. The computer usable program product of claim 11, responsive to the second port being already associated with a third identifier in the data structure, the computer usable program product further comprising:

computer usable code for forming a determination whether an information describing the association of the second port and the third identifier should be modified;

computer usable code for modifying, responsive to the determination being true, the information describing association of the second port and the third identifier to an information describing an association of the second port and the second identifier in the data structure; and computer usable code for adding, responsive to the determination being false, an information describing an association of the second port and the second identifier in the data structure.

13. The computer usable program product of claim 8, wherein the computer usable code for selecting the first port further comprises:

computer usable code for executing a port assignment algorithm, wherein the port assignment algorithm is one of (i) a round-robin selection algorithm, (ii) a utilization based selection algorithm, and (iii) a randomized selection algorithm.

14. The computer usable program product of claim 8, further comprising:

computer usable code for concluding, responsive to the set of ports including a plurality of ports, that the set of ports participate in the link aggregation channel.

15. The computer program product of claim 8, wherein the computer usable code is stored in a computer readable storage medium in a data processing system, and wherein the computer usable code is transferred over a network from a remote data processing system.

16. The computer program product of claim 8, wherein the computer usable code is stored in a computer readable storage medium in a server data processing system, and wherein the computer usable code is downloaded over a network to a remote data processing system for use in a computer readable storage medium associated with the remote data processing system.

17. A data processing system for selective link aggregation in a virtualized data processing environment, the data processing system comprising:

a storage device including a storage medium, wherein the storage device stores computer usable program code; and a processor, wherein the processor executes the computer usable program code, and wherein the computer usable program code comprises:

computer usable code for receiving at a switch, a first data packet;

computer usable code for determining a first identifier associated with the first data packet, the first identifier corresponding to a first logical partition in a logical partitioned data processing system, wherein the logical partitioned data processing system includes a second logical partition, wherein the first logical partition and the second logical partition share a physical input/output adapter (PIOA), wherein a first port in the PIOA operates by participating in the link aggregation channel for the first logical partition and the first port in the PIOA operates without participating in any link aggregation channel and as a non-aggregated communication link for the second logical partition;

computer usable code for performing a lookup in a data structure to determine a set of ports associated with the first identifier;

computer usable code for retrieving from the data structure the set of ports, the set of ports including the first port;

computer usable code for selecting the first port from the set of ports; and computer usable code for transmitting the first data packet from the first port to the first logical partition.

18. The data processing system of claim 17, wherein the data structure is a participating port table accessible to the switch, the data structure comprising:

a set of records, a record in the set of records associating an identifier with a port.

19. The data processing system of claim 17, further comprising:

computer usable code for manipulating the data structure, the computer usable code for manipulating including computer usable code for one of (i) adding, (ii) deleting, and (iii) modifying, an association between a second port and a second identifier in the data structure, wherein the computer usable code for adding the association further comprises:

computer usable code for receiving at the second port a second data packet;

computer usable code for determining the second identifier associated with the second data packet;

computer usable code for associating, responsive to the second port not already being associated with the second identifier in the data structure, the second port with the second identifier; and computer usable code for adding information describing the association of the second port with the second identifier to the data structure.

20. The data processing system of claim 19, responsive to the second port being already associated with a third identifier in the data structure, the data processing system further comprising:
- computer usable code for forming a determination whether an information describing the association of the second port and the third identifier should be modified;
- computer usable code for modifying, responsive to the determination being true, the information describing association of the second port and the third identifier to an information describing an association of the second port and the second identifier in the data structure; and
- computer usable code for adding, responsive to the determination being false, an information describing an association of the second port and the second identifier in the data structure.

21. The computer usable program product of claim 8, further comprising:
- computer usable code for concluding, responsive to the set of ports including a single port, that the single port is a part of a non-aggregated link.

* * * * *